United States Patent
Butler et al.

(10) Patent No.: US 6,268,037 B1
(45) Date of Patent: Jul. 31, 2001

(54) HEAT SHIELD FOR BLOW-MOLDED COMPONENT

(75) Inventors: Richard M. Butler, Canton, MI (US); Hiten T. Shah, Delaware, OH (US)

(73) Assignee: Acoust-A-Fiber Research and Development, Inc., Delaware, OH (US)

( * ) Notice: Subject to any disclaimer, the term of this patent is extended or adjusted under 35 U.S.C. 154(b) by 0 days.

(21) Appl. No.: 09/181,271

(22) Filed: Oct. 28, 1998

(51) Int. Cl.[7] .................................................. B32B 3/26
(52) U.S. Cl. .......................... 428/100; 428/99; 428/132; 428/133; 428/139; 428/140; 428/166; 428/178; 428/223; 428/457; 428/220; 264/523; 264/241; 264/259; 264/264; 264/269; 264/271.1; 264/274; 264/275; 264/279; 220/560.13; 220/592.11; 220/529.21
(58) Field of Search ............................. 428/99, 100, 132, 428/133, 139, 140, 166, 178, 223, 457, 220; 264/523, 241, 259, 264, 269, 271.1, 274, 275, 279; 220/560.13, 592.11, 592.21

(56) References Cited

U.S. PATENT DOCUMENTS

| 5,188,981 | 2/1993 | Stiles et al. . |
| 5,656,353 | 8/1997 | Butler . |
| 5,672,405 | * 9/1997 | Plunk, Jr. et al. .................... 428/133 |
| 5,846,634 | * 12/1998 | Werth et al. .......................... 428/138 |
| 6,012,493 | * 1/2000 | Remke et al. ......................... 138/38 |

* cited by examiner

*Primary Examiner*—William P. Waltkins, III
(74) *Attorney, Agent, or Firm*—Frank H. Foster; Kremblas, Foster, Phillips & Pollick

(57) ABSTRACT

The present invention relates to a method for making a shielded automobile component and the shielded automobile component itself. The component includes a composite formed of a metal sheet which includes protrusions which extend from a surface of the metal sheet and a blow-molded thermoplastic layer formed around the protrusions which fixes the blow-molded layer to the metal sheet during the molding process. The protrusions on the metal sheet define plain polygonal areas which are free of protrusions.

14 Claims, 4 Drawing Sheets

HEAT SHIELD FOR BLOW-MOLDED COMPONENT

BACKGROUND OF THE INVENTION

1. Field of the Invention

The present invention relates generally to a composite automobile component and the method of making that automobile component. More particularly, the present invention relates to a fuel tank which includes a shield to protect the fuel tank from heat generated from other engine components and a method of making the shielded fuel tank in situ while blow-molding the fuel tank in a mold. Even more particularly, the present invention relates to a shield attached to a blow-molded component so as to create a plurality of air gaps therebetween.

2. Description of the Related Art

In the past, fuel tanks have been made from metal, more particularly steel. Steel is relatively impervious to damage from many of the road hazards present, namely rocks, potholes, and the like. Also, steel will not deform or degrade in the presence of heat radiated from other components of the automobile, such as the exhaust system, which are located near the fuel tank.

More recently, however, it has become desirable to decrease the weight of vehicles to achieve better fuel efficiency, among other reasons. To decrease the weight, modifications have been made to many of the components of vehicles, including the fuel tank. The fuel tanks have begun to be made from lighter, less expensive materials, such as aluminum and plastics. However, a problem has arisen with the use of plastic in particular as the material from which the fuel tank is made.

A primary problem with substituting plastic for steel in the fuel tank is that, as mentioned earlier, there are components which radiate heat located near the fuel tank. Because plastic has a lower melting temperature than steel, the plastic fuel tank is more likely to degrade or rupture from the heat generated by the heat-radiating components, particularly the exhaust system, opposed to the steel fuel tank. As a result, it is necessary to provide some sort of shielding on or near the plastic fuel tank to reduce the heat transmitted to the fuel tank.

One option in preventing heat transmission is to install a heat shield between the exhaust system and the fuel tank. A variety of types of heat shields have been used in automobiles to shield components from heat. One example is found in the patent to Butler, U.S. Pat. No. 5,656,353. However, with the Butler shield as with others, the shield must be spaced from each of the heat-radiating component and the component the shield protects. In the context of the fuel tank and exhaust, the space limitations, such as requirements for clearance of the exhaust from the ground, prohibit the degree of spacing required by the Butler shield. A shield which is formed integrally with the fuel tank is, therefore, preferable.

An example of one attempt to provide a shield for a plastic fuel tank is disclosed in the patent to Stiles et al., U.S. Pat. No. 5,188,981. Stiles describes a structure which includes a number of layers. Most particularly, Stiles describes a fuel tank made of a thermoformable material and including a localized heat shield. However, in the Stiles reference, it is critical that the heat shield material and thermoformable material be selected such that the thermoformable material can penetrate into a portion of the heat shield material. This necessary characteristic limits the materials from which the heat shield and the fuel tank may be made.

The structures previously used do not allow for sufficient flexibility in the materials used to create the shield and are limited relative to their position with respect to the shielded and heat-generating components. Nor do these prior systems provide sufficient flexibility to permit their use as shields over more than a relatively limited area of a fuel tank which may be desirable to shield the fuel tanks from other road hazards, such as rocks, potholes, and the like. The present invention provides an alternative which more satisfactorily fulfills these highly desirable objectives.

An invention related to the present invention, entitled HEAT SHIELDS FOR BLOW-MOLDED COMPONENTS AND METHOD OF MAKING was filed in the U.S. Patent and Trademark Office on Oct. 19, 1998, and has been given Serial No. 09/175,398 now abandoned. The invention disclosed and claimed in that application may be modified to achieve a different result from the result garnered without the modifications disclosed and claimed in the present invention. The disclosure in the above-mentioned application is incorporated herein by reference.

SUMMARY OF THE INVENTION

The present invention relates to a composite automobile component. The automobile component includes a metal sheet and a blow-molded layer. The metal sheet includes protrusions extending away from a first broad surface of the metal sheet. The blow-molded layer is attached to the metal sheet by forming the blow-molded layer in situ in a surrounding relationship to the protrusions, thereby fixing the blow-molded layer to the metal sheet.

The metal sheet is configured such that the protrusions define regular polygonal shapes across the metal sheet. These shapes are plain areas on the metal sheet. In the blow-molding process, a plurality of air gaps are formed between the blow-molded layer and the metal sheet, each air gap being defined between each plain polygonal area on the metal sheet and a corresponding area on the blow-molded layer.

The plain polygonal areas may have a width of between about 3/8 to 5 inches. A preferred width is about one inch. Each plain polygonal area may share sides with adjacent plain polygonal areas, and these sides may be of equal length. One preferred plain polygonal area is hexagonal.

The protrusions may be formed by punching the metal sheet and the protrusions may be spaced from one another by about 3/16 inch. The metal sheet may be at least about 0.0005 inch thick. The blow-molded layer may be made from a thermoplastic material.

Each plain polygonal area may be of a configuration and size selected to control the shrinkage of the blowmolded layer away from the first broad surface of the metal sheet to maintain the engagement of the blow-molded layer with the protrusions and to define a plurality of air gaps between the metal sheet and the blow-molded layer. The plain polygonal area is preferably large enough to allow the metal sheet to maintain the essentially same configuration as established in the mold while the thermoplastic material cools to form the blow-molded layer.

In the method of this invention, the metal sheet having the qualities mentioned above is releasably attached to an interior surface of a mold. A thermoplastic material is placed in the mold. The thermoplastic material is blowmolded to form a layer conforming to the shape of the mold and into contact with and in surrounding engagement to the protrusions. The plain polygonal areas and corresponding areas of the blow-molded layer define a plurality of air gaps once the thermoplastic material has fully retracted upon cooling. The protrusion on the metal sheet may be formed by punching.

Through the use of this combination of elements, an improved automobile component is shown.

Figure 1:
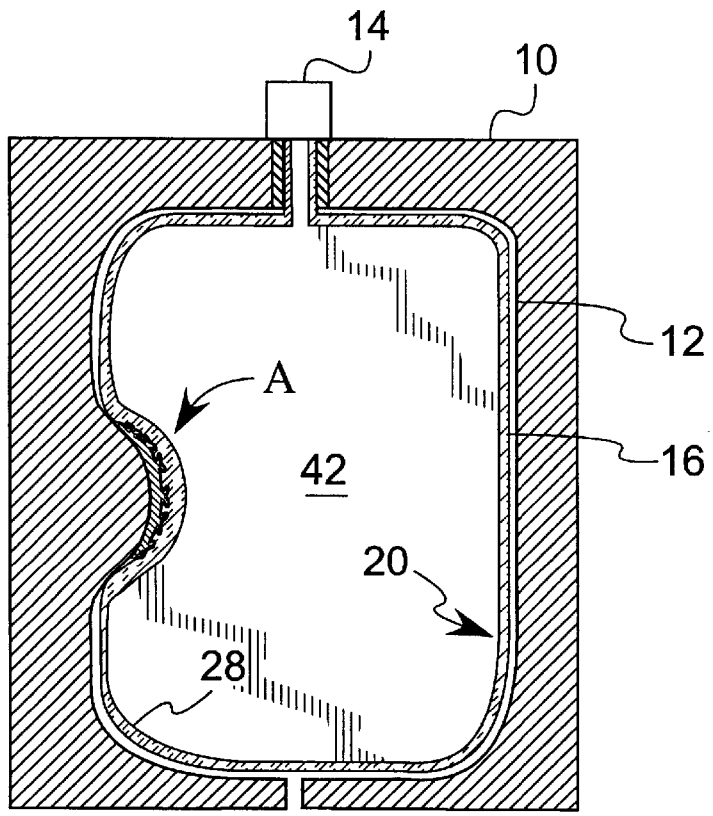
FIG. 1 is a cross-sectional view of a mold containing the shielded automobile component according to the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art. Those skilled in the art will recognize that there are many, and in the future may be additional, alternative elements which are recognized as equivalent because they provide the same operations.

DETAILED DESCRIPTION OF THE INVENTION

The present invention relates to a shielded composite automobile component and a method of making such a shielded automobile component. The component and method are herein described with reference to the drawings.

Turning first to FIG. 1, there is illustrated a mold 10 which includes an interior surface 12. FIG. 1 shows an apparatus 14 conventional in the art for blow-molding. The thermoplastic material 16 is blow-molded in conjunction with the present invention in a conventional way using a conventional mold 12 and apparatus 14 to form a novel shielded automobile component 20. The present invention relates to a shielded automobile component 20, and therefore, the remaining description and drawings will focus on the area which is shielded, noted as A in FIG. 1.

Figure 2:
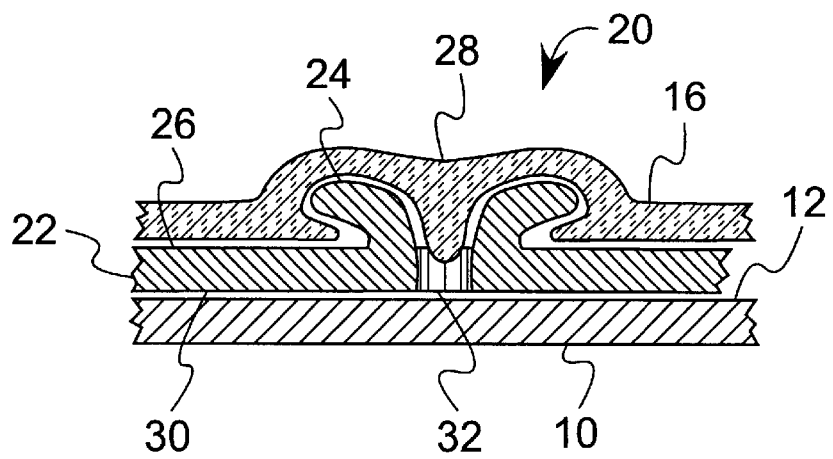
FIG. 2 is a cross-sectional view of an embodiment of the first metal sheet and blow-molded layer fixed together according to the present invention.

In its simplest form, as is shown in FIG. 2, the shielded automobile component 20 takes the form of a metal sheet 22 which includes protrusions 24 which extend away from a first broad surface 26 of the metal sheet 22. This metal sheet 22 is then fixed to a blow-molded layer 28, the blow-molded layer 28 being formed in-situ in surrounding relationship with the protrusions 24. The metal sheet 22 in this configuration and any other elements attached to the metal sheet 22 as are described below, apart from the blow-molded layer 28, comprise the shield of the shielded automobile component 20. The metal sheet 22 is preferably made from aluminized stainless steel, aluminum-clad steel, stainless steel, galvanized steel, aluminized steel, or aluminum, and preferably has a thickness between about 0.0005 inch and about 0.080 inch. The thickness which is required for any given automobile is dependent, in part, on the durability requirements for the shielded automobile component 20, based on projected exposure to gravel and the like. As is shown in FIG. 2 and the remaining Figs., the metal sheet 22 may be shaped to conform to a portion of the interior surface 12 of the mold 10.

As is shown most clearly in FIG. 2, a preferred embodiment of the metal sheet 22 is fixed to the blow-molded layer 28. Once the thermoplastic material 16 has been fully expanded to conform to the shape of the mold 10 and to become the blow-molded layer 28 (see FIG. 1), the blow-molded layer 28 also comes into surrounding engagement with the protrusions 24 and abuts the first broad surface 26 of the metal sheet 22. An opposing broad surface 30 of the metal sheet 22 rests against the interior surface 12 of the mold 10.

In the preferred embodiment, the protrusions 24 are J-shaped and are formed in the metal sheet 22 by punching the metal sheet 22, most preferably by a flare punch or a spike roll. These punching processes are well known in the art. The punching process forces the protrusions 24 from the metal sheet 22 and leaves a series of holes or perforations 32 in the metal sheet 22 adjacent the protrusions 24. In this punching process, it is preferred that the punch be configured to form a hole 32 that is about 0.032 inch in diameter. The hole may be round or square or may be a slot. If a punched metal sheet 22 as shown in FIG. 2 is used, some of the thermoplastic material 16 from the blow-molded layer 28 fills the perforations 32 in the metal sheet 22. Since the blow-molded layer may be as thin as ⅛ inch, it is preferred that the protrusions 24 extend away from the first broad surface 26 of the metal sheet 22 no more than ⅛ inch, and preferably at least about 1 mm and at most about 3 mm.

It is preferable that the protrusions 24 be hook-shaped or J-shaped. These shapes are preferable because they permit the blow-molded layer 28 to flow under and around the protrusions 24 to substantially surround the protrusions 24 and to keep a sufficiently secure hold on the protrusions 24 to firmly fix the blow-molded layer 28 and metal sheet 22 to one another. An alternative preferred configuration for the protrusions 24 is to include barbs on the protrusions 24.

To form a shielded automobile component 20 according to the present invention, there are a variety of steps which must be taken. In its simplest form, the method involves placing the metal sheet 22 in the mold 10, placing a thermoplastic material 16 in the mold, and blow-molding the thermoplastic material 16 to conform to the shape of the mold 10 and forming the thermoplastic material 16 against the broad surface 26 and into a surrounding relationship with the protrusions 24 on the metal sheet 22, to fix the now blow-molded layer 28 to the metal sheet 22. However, a number of variations of this basic product and method are possible.

Figure 3:
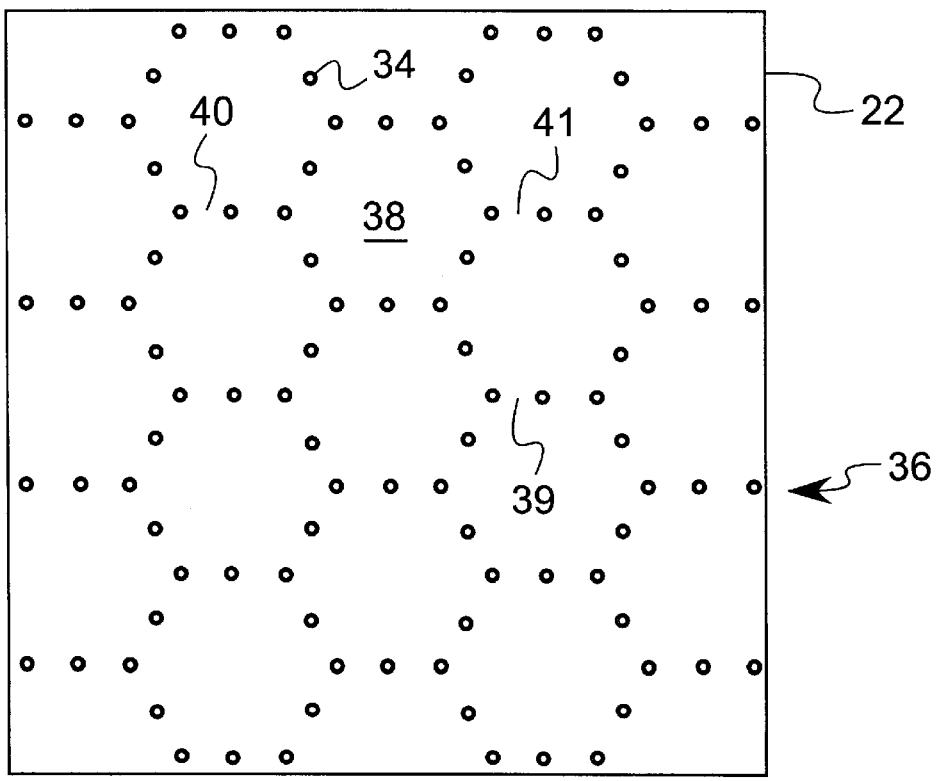
FIG. 3 is a top view of an embodiment of a first metal sheet according to the present invention.
Figure 4:
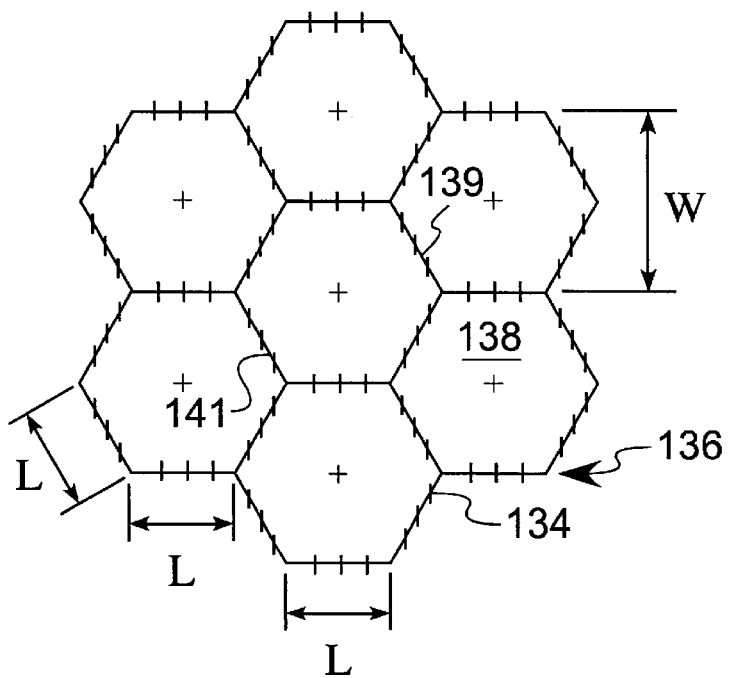
FIG. 4 is a top view of another embodiment of a first metal sheet according to the present invention.

Turning to FIGS. 3 and 4, similar preferred embodiments of the first metal sheet are shown. In the preferred embodiment, the protrusions 34, 134 define polygonal planar areas 38, 138 with sides 36, 136. It is most preferred, as is shown in FIG. 4, that the sides 136 which define the plain polygonal areas 138 be equal in length L. It is preferred that the length L of each side be about 0.75 inch. It is also preferred that the width W of each plain polygonal area 138 between about ⅜ inch and at about 5 inches, and most preferably about 1.3 inches. The term "plain," for purposes of the present disclosure, means, essentially, free from perforations and other types of irregularities and discontinuities. Because the metal sheet 22 may be shaped to conform to the interior surface 12 of the mold 10, the term "plain" does not indicate that the area is necessarily flat, but instead may be curved in a manner similar to the interior surface 12 of the mold 10.

Figure 11:
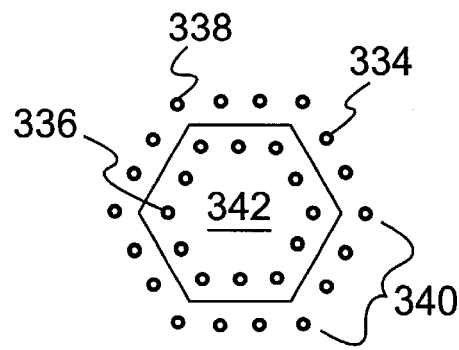
FIG. 11 is a top view of yet another embodiment of a first metal sheet according to the present invention.

FIGS. 3 and 4 show similar preferred configurations of the protrusions 34, 134. Each of these FIGS. shows the plain polygonal areas 38, 138 as being hexagonal. However, the hexagonal shape is not, by itself, critical to the invention. The protrusions 34, 134 can be arranged to define other types of plain polygonal areas 38, 138. Other preferred polygons include pentagon, octagon, and rectangle. It is also more preferred to use polygons in which one side 39, 139 is parallel to another side 41, 141. The use of circles is not as preferred. In addition, it is preferred that each polygonal area 38, 138 have a shared side 40, 140 which it shares with another polygonal area 38, 138. These shared sides 40, 140 may also be considered mutual sides 40, 140. FIG. 11 shows yet another embodiment of the protrusions 334. The protrusions 334 may be arranged concentrically into an interior row 336 and an exterior row 338. The space defined between the interior row 336 is considered the plain area and the length of a side 340 the exterior row 338 would be considered the length of a side. The adjacent plain polygonal areas 342 would join at or share their exterior rows 338.

Figure 5:
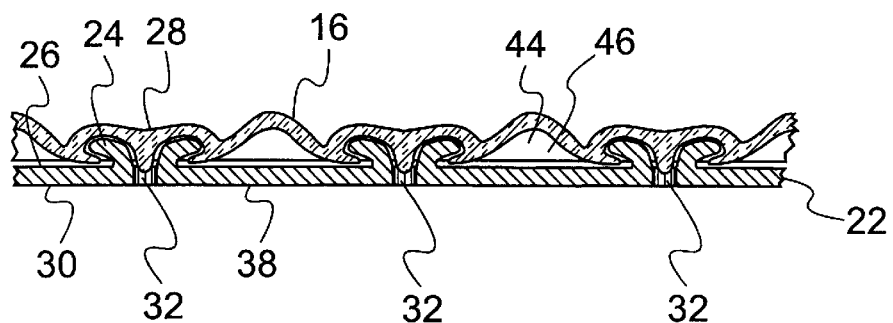
FIG. 5 is another cross-sectional view of an embodiment of the first metal sheet and blow-molded layer fixed together according to the present invention.

FIG. 5 shows a cross-sectional view of the metal sheet 22 fixed to the blow-molded layer 28 after the molding process is complete. In order to mold the thermoplastic material 16, it must be heated. Hot air is forced into the central area 42 (see FIG. 1) of the mold 10 and thermoplastic material 16. This hot air expands the thermoplastic material 16 until it reaches an outer position adjacent the interior surface 12 of the mold 10. This is the position shown in FIG. 1. The interior surface 12 of the mold 10 is cold relative to the thermoplastic material 16 when the thermoplastic material 16 comes into contact with the interior surface 12 of the mold 10 in the molding process. Thermoplastic materials 16, particularly those used for automobile parts such as those which are desirable for use in connection with the present disclosure, have a tendency to shrink and therefore retract from the interior surface 12 of the mold 10 towards the central area 42 when they are cooled. After the molding, the high density polyethylene, which is the most common material used for the blow-molded layer, shrinks about 2–3% in the cooling process which is performed out of the mold. When no shield or other addition is to be attached to the thermoplastic material 16 during the molding process, the thermoplastic material 16 will retract from the interior surface 12 of the mold 10 generally evenly over the surface of the thermoplastic material 16.

However, when a shield is attached to thermoplastic material 16 in a manner wherein insufficiently large plain areas are not formed between protrusions 24, the thermoplastic material 16 does not shrink evenly over the surface of the thermoplastic material 16. Instead, the attachment of the metal sheet 22 to thermoplastic material 16 unduly restrains the ability of the thermoplastic material 16 to shrink evenly and causes an uncontrolled warping. Since the warping is not controlled or consistent between parts or even in areas of the same part, the parts produced tend to have different surface configurations, including the surface 30 of metal sheet 22.

Any tendency of material 16 to warp may be controlled to a much greater extent by using a metal sheet 22 provided with the configuration or pattern of protrusions 24 discussed in detail above. When such a pattern of protrusions 24 is used, the second broad surface 30 of the metal sheet 22 is not warped to any substantial degree with respect to the shape of the interior surface 12 of the mold 10 as the plain areas 38 more freely permit the material 16 to retract and form blister-like pockets. Therefore, the forces applied to the metal sheet 22 are lessened and sheet 22 tends to retain essentially the same configuration as formed by the interior surface 12 of the mold 10. The thermoplastic material 16 retracts from the interior surface 12 of the mold 10 to a greater degree in the areas which correspond with the plain areas 38 of the metal sheet 22 to form the blister-like pockets or recesses, as at 44. When the thermoplastic material 16 fully cools and hardens to become the blow-molded layer 28, air gaps such as 46, defined between the blow-molded layer 28 and the first broad surface 26 of the metal sheet 22, are formed. The use of this configuration alleviates the uneven cooling and warping of the material 16 and any tendency of the metal sheet to become deformed. Further, it optimizes the thermal performance of the shielding layer, metal sheet 22.

There are two desirable results which are fulfilled in this method to make such a product 20. First, a substantially consistently-shaped series of products is produced, rather than a series of products having configurations which vary substantially from one another. Second, an air gap 46 is created between the metal layer 22 and much of the blow-molded layer 28, the air gap 46 providing an additional degree of insulation in conjunction with the metal sheet 22.

Figure 6:
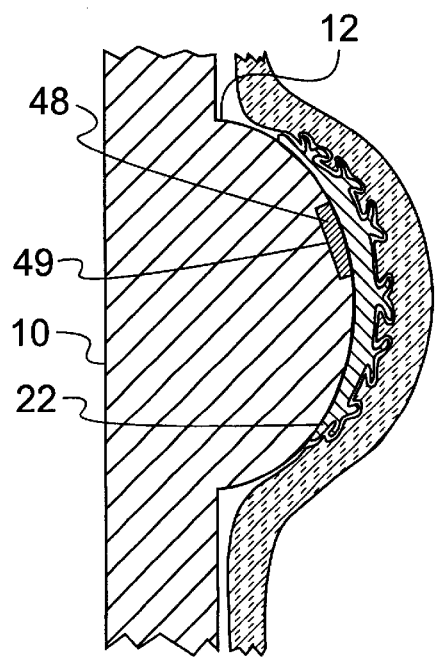
FIG. 6 is a cross-sectional view of a first embodiment of a releasable attachment of the first metal sheet to the mold.

Other additions and modifications to the product and process disclosed herein are also possible. The metal sheet 22 must be releasably attached to the mold 10. FIG. 6 shows a first embodiment of this releasably attaching step. In FIG. 6, a magnet 48 is placed on the interior surface 12 of the mold 10 or in a recess 49 in the interior surface 12 of the mold 10. The metal sheet 22 is then placed in contact with the magnet 48. Alternatively, the metal sheet 22 may be held in place by a vacuum device.

Figure 7:
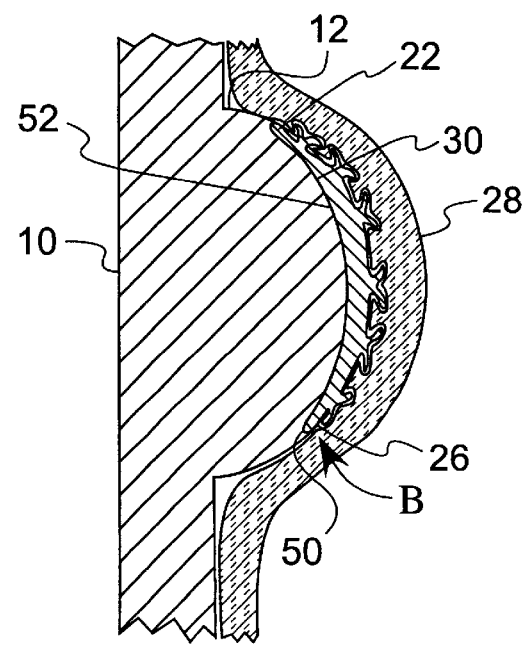
FIG. 7 is a cross-sectional view of a second embodiment of a releasable attachment of the first metal sheet to the mold.

In a second embodiment shown in FIG. 7, the interior surface 12 is configured to receive the metal sheet 22. This configuring includes forming a recess 50. The recess 50 is preferably sufficiently deep to allow the first broad surface 26 of the metal sheet 22 to be coplanar with the interior surface 12 of the mold 10 while the opposing broad surface 30 of the metal sheet 22 rests against the bottom 52 of the recess 38 in the mold 10, as is shown at B.

Figure 8:
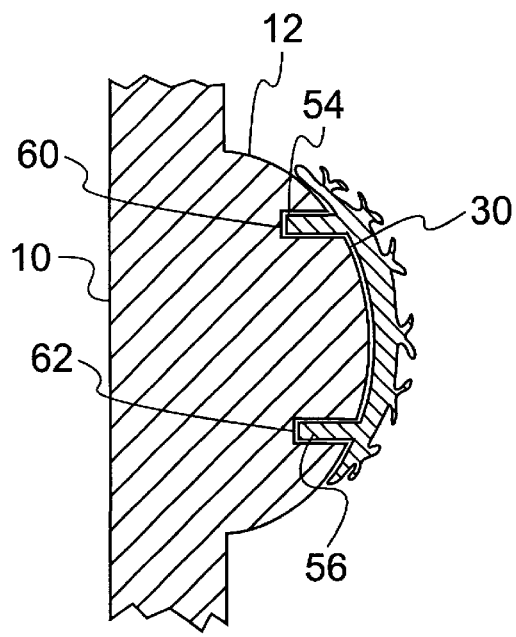
FIG. 8 is a cross-sectional view of a third embodiment of a releasable attachment of the first metal sheet to the mold.
Figure 9:
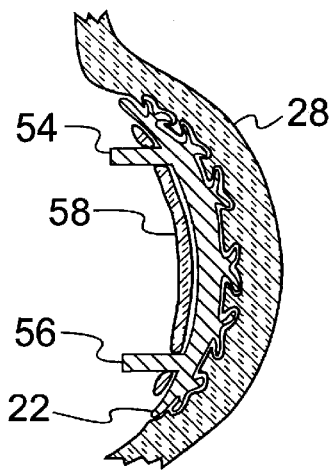
FIG. 9 is a cross-sectional view of a shielded automobile component according to the present invention, the shield including fasteners and an added layer of insulation.

FIGS. 8 and 9 shows yet another embodiment which includes fasteners 54, 56 attached to the opposing broad surface 30. The interior surface 12 of the mold 10 may be configured to receive the fasteners 54, 56 in recesses 60, 62. In this embodiment, an additional layer of insulation 58 may slidably attached on the fasteners 54, 56 (see FIG. 9). The additional layer of insulation 58 may be an additional metal sheet, a metal sheet configured to provide an air gap between the first metal sheet 22 and the additional metal sheet 46, or a layer of any other insulation which is conventionally used in the industry for insulating purposes. Most preferably, the additional layer of insulation 46 is a fiber-engineered composite, metal matrix, or multi-layer composite. Additional layers of insulation (not shown) may also be added on the fasteners 54, 56. These insulation layers 58 may be desirable if a single metal sheet 22 is insufficient to prevent thermal or physical damage to the blow molded layer 28. One of ordinary skill in the art is able to determine when additional insulation is desirable and the type of insulation required, based on the size of the metal sheet 22, the proximity of the metal sheet 22 to the heat source (not shown), and the amount of heat emitted by the heat source.

Figure 10:
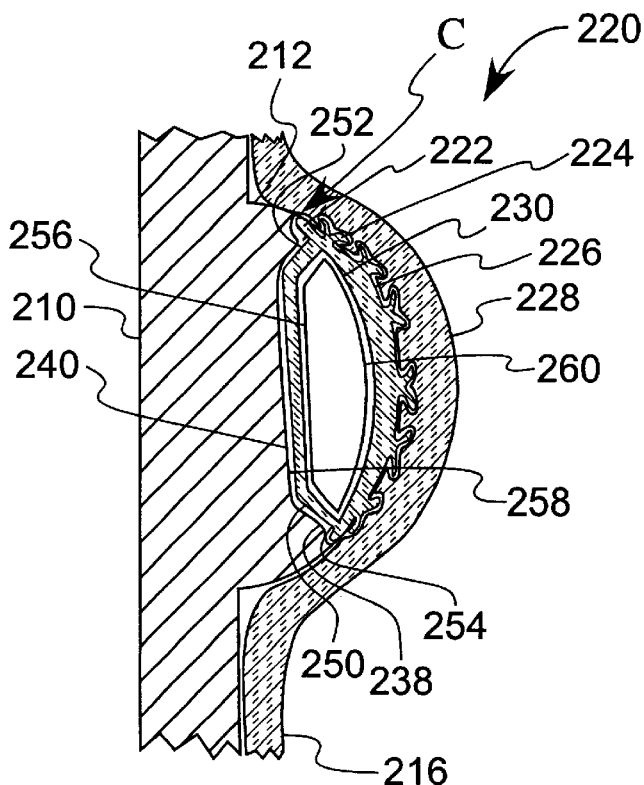
FIG. 10 is a cross-sectional view of a second embodiment of a shielded automobile component according to the present invention.

Turning now to FIG. 10, yet another embodiment of the shielded automobile component and mold configuration are shown. The shield in this embodiment includes several parts. The shield includes a first metal sheet 222 which further includes protrusions 224 which extend away from a first broad surface 226 of the first metal sheet 222. The preferred materials and dimensions of the first metal sheet 222 are the same as those disclosed above in connection with the other embodiments of the metal sheet 22.

Attached to the first metal sheet 222 is a second metal sheet 250. The second metal sheet 250 is preferably made of aluminum, aluminum clad steel, aluminized steel, stainless steel, aluminized stainless steel, or cold rolled steel and preferably has a thickness between about 0.0005 inch and 0.080 inch. The second metal sheet 250 is fixed to the first metal sheet 222, and preferably is fixed to the first metal sheet 222 only at its edges 252, 254. The edges 252, 254 are preferably fixed to the first metal sheet 222 by welding, but the metal sheets 222, 250 may alternatively be hemmed or toggled together. The second metal sheet 250 is preferably configured to include a depression 256. The depression 256 is configured to form a cavity 258 between the first metal sheet 222 and the second metal sheet 250 after the edges 252, 254 of the second metal sheet 250 are fixed to the first metal sheet 222.

One feature of this embodiment is that a layer of insulation 260 may be placed in the cavity 258. It is preferable that if a layer of insulation 260 is to be included, the layer of insulation 260 is placed on the opposing broad surface 230 of the first metal sheet 222 prior to fixing the edges 252, 254 of the second metal sheet 250 to the first metal sheet 222. The layer of insulation 260 may be selected from any of the types of insulation known and used conventionally, but is most preferably selected from among the following: glass fibers, most particularly E-glass fibers, basalt, ceramic, wood fiber, or multiple layers of metal. However, the layer of insulation 260 need not be used in each instance and instead the cavity 258 may be an air gap.

If such a configuration is used for the shield, the mold 210 must also be configured appropriately in order for the shield to be releasably attached to the mold 210. It is preferable that if this configuration of the shield is used, the step of releasably attaching the shield to the interior surface 212 of the mold 210 includes configuring the interior surface 212 of the mold 210 to include a recess 238. The use of a recess 238 rather than a magnet 36, as was shown in FIG. 4, is preferred because the use of the two metal sheets 222, 250 and the cavity 258 requires the shield of this embodiment to be substantially thicker than the thickness of the metal sheet 22 in the previous embodiments. Since the purpose of the shield is to shield the blow-molded layer 228, it is preferable that the blow-molded layer 228 contact only the first metal sheet 222. Accordingly, the use of the recess 238 in the interior surface 212 of the mold 210 is preferred to avoid any flow of thermoplastic material 216 past the first metal layer 222. This is likely to occur if only a magnet or similar releasable attaching means is used for this double metal layer configuration.

The recess is preferably deep enough that when the second metal sheet 250 rests on the bottom 240 of the recess 238, the first broad surface 226 of the first metal sheet 222 is substantially coplanar with the interior surface 212 of the mold 210, as at C, in order to essentially eliminate the flow of thermoplastic material beyond the metal sheet 22. It is also preferred that the recess 238 be configured to snugly receive the shield for the same reason.

Regardless of the precise embodiment of the configuration of the shield and regardless of the precise method of releasably attaching the metal sheet or shield to the mold used, the remaining steps of the process are the same, as disclosed and discussed in detail above.

Additional modifications are possible for use in connection with the present invention. First, the FIGS. as shown in connection with the present invention show the shield being releasably attached to a U-shaped area on the interior surface of the mold. It is possible, however, for the shape of the mold area to which the shield is releasably attached to be different and, in particular, more irregular. In such a case, it is especially preferable that the shield be shaped to conform to the interior surface of the mold prior to placing the shield in the mold.

Alternatively, it is possible to mold the metal sheet in situ in addition to creating the blow-molded layer in situ. If the heat source which passes near the automobile component does not generate a high heat, the shield may be made from a very thin metal layer only. In such a case, the very thin metal layer may be releasably attached to the interior surface of the mold, most preferably with magnets, and the force of the expanding thermoplastic material during the blow-molding process would also form the metal sheet into the appropriate shape, conforming to the interior mold surface.

It is also noted that in the FIGS., the shield is shown as covering only a small portion of the blow-molded thermoplastic layer. In the typical situation in an automobile, it is necessary only to shield a small area. However, the invention need not be limited in this way. Multiple shields covering differing or spaced areas of the component and shields covering a larger portion of the blow-molded layer are easily attained according to the present invention and may be required in certain circumstances if larger areas of the blow-molded layer require shielding from heat sources or other forms of damage. If deemed necessary, the entire blow-molded layer may be covered by a shield.

While certain preferred embodiments of the present invention have been disclosed in detail, it is to be understood that various modifications may be adopted without departing from the spirit of the invention or scope of the following claims.

What is claimed is:

1. A composite heat-shielded component, comprising:
   (a) a metal sheet, the metal sheet including protrusions extending away from a first broad surface of the metallic layer, the protrusions being spaced from one another to define a pattern of plain polygonal areas on the sheet; and
   (b) a blow-molded layer attached in situ to the metal sheet, wherein the blow-molded layer is molded in-situ in surrounding relationship with the protrusions to attach the metal sheet to the blow-molded layer and forms a plurality of polygonal recessed areas defining a plurality of air gap pockets between the blow-molded layer and the metallic layer and surrounded by the protrusions.

2. The composite heat-shielded component according to claim 1, wherein the plain polygonal areas between the protrusions have a width between about 3/8 inch and about 5 inches.

3. The composite heat-shielded component according to claim 1, wherein the blow-molded layer is made of a thermoplastic material.

4. The composite heat-shielded component according to claim 3, wherein each of the plain polygonal areas between the protrusions defines an area which is sufficiently large to allow the metal sheet to maintain the same configuration as the mold while the thermoplastic material cools to form the blow-molded layer.

5. The composite heat-shielded component according to claim 1, wherein the plain polygonal areas share sides with adjacent plain polygonal areas.

6. The composite heat-shielded component according to claim 5, wherein each of the plain polygonal areas has a side which is parallel to another side of the plain polygonal area.

7. The composite heat-shielded component according to claim 1, wherein one protrusion forming a side of a respective plain polygonal area is spaced about 3/16 inch from an adjacent protrusion.

8. The composite heat-shielded component according to claim 1, wherein the plain polygonal areas have sides of equal length.

9. The composite heat-shielded component according to claim 1, wherein the metal sheet has a thickness of at least about 0.0005 inch.

10. The composite heat-shielded component according to claim 1, wherein the protrusions comprise hook-shaped pieces which are formed by punching the metal sheet.

11. The composite heat-shielded component according to claim 1, wherein the protrusions comprise barbs on the metal sheet.

12. The composite heat-shielded component according to claim 1, wherein each plain polygonal area is of a selected configuration and size to control the shrinkage of the blow-molded layer away from the first broad surface of the metal sheet while maintaining the engagement of the blow-molded layer with the protrusions and to define a plurality of air gaps between the metal sheet and the blow-molded layer.

13. The composite heat-shielded component according to claim 12, wherein each of the plain polygonal areas between the protrusions defines an area which is sufficiently large to allow the metal sheet to maintain the same configuration as the mold while the thermoplastic material cools to form the blow-molded layer.

14. The composite heat-shielded component according to claim 1, wherein the metal sheet is made from one of the following materials: aluminum, steel, stainless steel, aluminized steel, galvanized steel, or aluminum clad steel.

* * * * *